USOO5893675A

United States Patent [19]
Lange

[11] Patent Number: 5,893,675
[45] Date of Patent: Apr. 13, 1999

[54] TUBULAR MEMBER CONNECTOR

[76] Inventor: Fredric Lange, 13690 Elm Creek Rd., Osseo, Minn. 55369-9343

[21] Appl. No.: 08/885,358

[22] Filed: Jun. 30, 1997

[51] Int. Cl.[6] ........................................ F16B 7/00
[52] U.S. Cl. ................................. 403/297; 403/292
[58] Field of Search ........................... 403/297, 298, 403/403, 11, 12, 205, 292, 362

[56] References Cited

U.S. PATENT DOCUMENTS

| | | | |
|---|---|---|---|
| 2,645,509 | 7/1953 | Valenta | 403/297 |
| 3,469,339 | 9/1969 | Thomas . | |
| 3,484,830 | 12/1969 | Wagner | 285/397 |
| 3,574,367 | 4/1971 | Jankowski | 287/54 |
| 3,954,345 | 5/1976 | Morris | 403/297 |
| 3,977,800 | 8/1976 | Cassel | 403/172 |
| 4,637,193 | 1/1987 | Lange . | |
| 4,657,426 | 4/1987 | Targetti | 403/297 |
| 4,775,258 | 10/1988 | Lange . | |
| 4,859,109 | 8/1989 | Targetti | 403/297 |
| 4,958,953 | 9/1990 | Charondiere | 403/297 |
| 5,209,599 | 5/1993 | Kronenberg | 403/297 X |
| 5,642,957 | 7/1997 | Lange | 403/297 |

FOREIGN PATENT DOCUMENTS

| | | | |
|---|---|---|---|
| 2059829 | 5/1972 | Germany | 403/297 |
| 2103504 | 7/1972 | Germany | 403/297 |
| 449334 | 4/1968 | Switzerland | 403/297 |
| 371/31 | 1/1931 | United Kingdom | 403/297 |
| 723181 | 2/1955 | United Kingdom | 403/297 |
| 1052107 | 12/1966 | United Kingdom | 403/297 |
| 1097534 | 1/1968 | United Kingdom | 403/297 |
| 336915 | 10/1989 | United Kingdom | 403/297 |

*Primary Examiner*—Anthony Knight
*Assistant Examiner*—David Bochna
*Attorney, Agent, or Firm*—Alan Kamrath; Peterson, Wicks, Nemer & Kamrath PA

[57] ABSTRACT

A connector (10) for tubular members (12, 14) is disclosed including first and second connector elements (16, 18) each having U-shaped cross sections and first and second jaw members (20, 22). A set screw (30) is threaded into the central portion (24) of the second connector element (18) intermediate the first and second jaw members (20, 22) and has an end abutting with the central portion (24) of the first connector element (16). A collar (32) encircles the first and second connector elements (16, 18) and the set screw (30) intermediate the jaw members (20, 22). The first and second connector elements (16, 18) are biased together by first and second O-rings (50) positioned around the connector elements (16, 18) and on opposite sides of the set screw (30). The jaw members (20, 22) can be inserted in longitudinal insertion directions into the tubular members (12, 14) and the set screw (30) threaded into the second connector element (18) to separate the jaw members (20, 22) sufficiently to grip the inside surfaces of the tubular members (12, 14) with sufficient force to prevent relative movement therebetween. Each of the jaw members (20, 22) are arcuate shaped of an increasing spacing from their free ends (21, 23) for their insertion distance allowing the connector (10) to interconnect tubular members (12, 14) which are either longitudinally straight or arcuate.

20 Claims, 1 Drawing Sheet

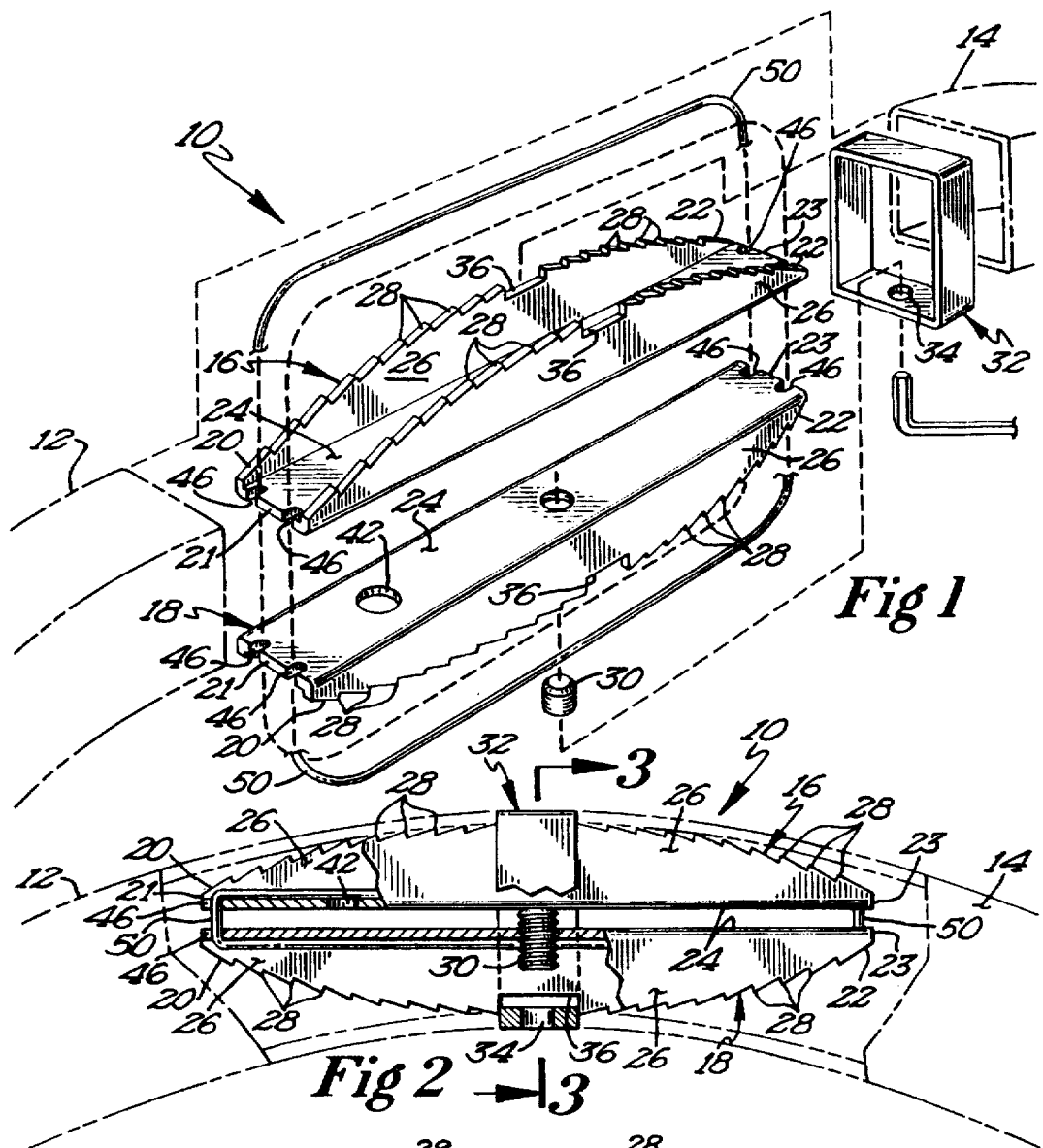
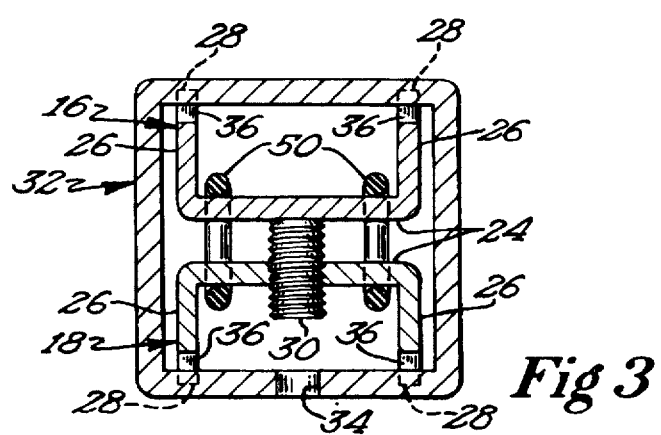

TUBULAR MEMBER CONNECTOR

BACKGROUND

The present invention generally relates to connectors, particularly to connectors for tubular members, and specifically to connectors for tubular members not requiring modifications to the tubular member, not requiring specific orientations of the tubular member, and not requiring movement in directions other than parallel to the tubular member during installation.

It is often desired to connect tubular members to various objects such as but not limited to connecting together the parallel tubes of first and second trusses to result in a single unitary truss having a span of their combined lengths. The almost universal mechanism for making such a connection is to bolt one truss to another. But in certain applications such as where it is desired to frequently connect and disconnect tubular members and/or where for aesthetic or other reasons bolts are not desired, other forms of connectors have been developed. As examples, U.S. Pat. Nos. 4,637,193 and 4,775,258 show connectors having male and female components attached by bolts to rods fastened inside of the tubular members. Thus, modification was required to the tubular members at least by fastening rods therein; due to its male/female nature, the tubular members could only be secured in corresponding orientations; and movement was required generally perpendicular to the tubular members to effect connection. Other forms of connection include connectors which slide with a friction fit in the ends of the tubular members such as shown in U.S. Pat. Nos. 3,469,339 and 5,209,599. However, such friction fit, slide connectors require close tolerances and were prone to allow separation when subjected to tensional forces parallel to the tubular members.

Another example of preferred connectors for tubular members is the type shown in U.S. Pat. No. 5,642,957 as well as U.S. Pat. Nos. 2,645,509; 3,484,830; 3,977,800; 4,657,426; and 4,859,109 and Australian Appln. No. 371/31. Each of these connectors connect tubular members by providing first and second jaw members insertable into the tubular member in a longitudinal insertion direction and separable after insertion a distance sufficient to allow the jaw members to grip the inside surface of the tubular member with sufficient force to prevent relative movement between the first and second jaw members and the tubular member, with the separation of the jaw members being operable from outside of the tubular member. However, such separable jaw member connectors were restricted for use in tubular members having straight linear shapes along their longitudinal lengths and were otherwise deficient such as by the number of components required and their manner of assembly.

Thus, a need continues to exist for other methods to connect tubular members and which overcome the shortcomings and disadvantages of prior connecting techniques.

SUMMARY

The present invention solves this need and other problems in the field of connecting tubular members by providing, in the preferred form, first and second jaw members having increasing spacing between their free edges from their free ends and which are separable to grip the inside surfaces of tubular members which are longitudinally straight or arcuate.

In other aspects of the present invention, first and second jaw members insertable into a tubular member are biased together by at least a first elastic member extending parallel to the insertion direction over each of the first and second jaw members and extending between the first and second jaw members and are separable by operation outside of the tubular member. In most preferred aspects of the present invention, the biasing member is located on the central portions and between the first and second legs of the first and second jaw members having U-shaped cross sections and are positioned in notches extending from the free ends of the central portions.

It is thus an object of the present invention to provide a novel connector for tubular members.

It is further an object of the present invention to provide such a novel connector which does not require modification of the tubular member.

It is further an object of the present invention to provide such a novel connector which does not require particular orientations of the tubular member to allow interconnection.

It is further an object of the present invention to provide such a novel connector which does not require movement in directions; other than parallel to the tubular member to effect connection.

It is further an object of the present invention to provide such a novel connector for connecting tubular members which are either longitudinally straight or arcuate.

It is further an object of the present invention to provide such a novel connector not requiring close tolerance manufacture.

It is further an object of the present invention to provide such a novel connector which securely grips the tubular member to prevent separation when subjected to tensional forces parallel to the tubular member.

It is further an object of the present invention to provide such a novel connector which maintains the tubular member In a desired rotational position without requiring connection between the tubular member and the connector.

It is further an object of the present invention to provide such a novel connector which distributes force under deflection to more securely grip the tubular member.

It is further an object of the present invention to provide such a novel connector of a simple design of few components that can be inexpensively manufactured and assembled.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIG. 1 shows an exploded perspective view of a connector for interconnecting first and second tubular members in a co-extensive and linear manner according to the preferred teachings of the present invention, with portions shown in phantom.

FIG. 2 shows a side elevational view of the connector of FIG. 1, with portions broken away.

FIG. 3 shows a cross sectional view of the connector of FIG. 1 according to section line 3—3 of FIG. 2.

All figures are drawn for ease of explanation of the basic teachings of the present invention only; the extensions of the figures with respect to number, position, relationship, and dimensions of the parts to form the preferred embodiment will be explained or will be within the skill of the art after

3 the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "top", "bottom", "first", "second", "Front", "back", "face", "outer", "inner", "upper", "lower", "height", "width", "length", "thickness", "end", "side", "axial", "radial", "longitudinal", "lateral", and similar terms are used herein, it should be understood that these terms have reference only to the structure shown in the drawings as it would appear to a person viewing the drawings and are utilized only to facilitate describing the illustrative embodiment.

DESCRIPTION

A connector for interconnecting a tubular member to another member according to the preferred teachings of the present invention is shown in the drawings and generally designated 10. In the most preferred embodiment of the present invention, connector 10 is an improvement of the type shown and described in U.S. Pat. No. 5,642,957. For purpose of explanation of the basic teachings of the present invention, the same numerals designate the same or similar parts in the present figures and the figures of U.S. Pat. No. 5,642,957. The description of the common numerals and connector 10 may be found herein and in U.S. Pat. No. 5,642,957 which is hereby incorporated herein by reference.

Referring to the drawings in detail, connector 10 interconnects a first tubular member 12 to and generally in line with a second tubular member 14. Tubular members 12 and 14 have annular cross sections in the preferred form of a parallelepiped shape and in the form shown are of a square shape. Tubular members 12 and 14 are typically formed of extruded aluminum. In preferred forms of the present invention shown, tubular members 12 and 14 have an arcuate shape along their longitudinal length.

In the most preferred form, connector 10 includes a first connector element 16 and a second connector element 18 formed separately from connector element 16. Each connector element 16 and 18 includes first and second jaw members 20 and 22 integrally connected together and extending along a straight line. In the most preferred form, jaw members 20 and 22 terminate in free ends 21 and 23, respectively. In the most preferred form, elements 16 and 18 have generally U-shaped cross sections perpendicular to their longitudinal axes and include a flat central portion 24 having a length generally equal to or less than the width dimension of tubular members 12 and 14 and for slideable receipt within the inside surfaces of tubular members 12 and 14. First and second legs 26 upstand on opposite sides of central portion 24 and in the form shown generally perpendicular thereto. The free edges of legs 26 of jaw members 20 and 22 are cut to define teeth 28. In the most preferred form, elements 16 and 18 are formed of material having a hardness greater than tubular members 12 and 14 and in the most preferred form are formed of steel.

In the preferred form, the height of legs 26 above central portion 24 increases from free ends 21 and 23 to the connection between first and second jaw members 20 and 22. In the most preferred form, the minimum height of legs 26 at is free ends 21 and 23 is generally equal to the thickness of flat central portion 24 and with the maximum height of legs 26 above central portion 24 at the connection

4 between first and second jaw members 20 and 22 being generally equal to but slightly less than one-half of the height dimension Or tubular members 12 and 14. In the most preferred form, the free edges of legs 26 of jaw members 20 and 22 have an arcuate shape from free ends 21 and 23 to the connection between first and second jaw members 20 and 22.

In the most preferred form, first and second, generally semicircular notches 46 are formed in flat central portion 24 and extend from free ends 21 and 23 adjacent to legs 26 and spaced from each other.

Connector 10 according to the teachings of the present invention generally includes provisions for changing the spacing between connector elements 16 and 18 to separate the pair of jaw members 20 and 22, with such provisions being operable from outside of tubular members 12 and 14. In the preferred form, a set screw 30 extends between connector elements 16 and 18 and in the most preferred form is threadably received in connector element 18 between jaw members 20 and 22. Set screw 30 has a first end including a recess for receipt of a tool such as an alien wrench and a second end for abutment with central portion 24 of connector element 16 intermediate jaw members 20 and 22. It can then be appreciated that by threading set screw 30 into element 18, the spacing between central portions 24 of connector elements 16 and 18 increase, with thee abutment of the second end of set screw 30 with element. 16 holding central portions 24 of elements 16 and 18 apart along the line defined by set screw 30. Similarly by threading set screw 30 out of element 18, central portions 24 of elements 16 and 18 can be moved together such that the spacing between central portions 24 of connector elements 16 and 18 along the line defined by set screw 30 decrease.

In the preferred form shown, suitable provisions are provided for retaining connector elements 16 and 18 as a single unit. in particular, connector 10 further includes provisions 50 for biasing connector elements 16 and 13 together which in the preferred form are first and second O-rings each having an inside diameter generally equal to and preferably slightly less than twice the length of connector element 16 or 18 between free ends 21 and 23. O-rings 50 have cross sections of a shape for receipt in notches 46 and of a dimension parallel to central portions 24 which is substantially less than one-half the spacing between legs 26. First and skied O-rings 50 extend parallel to the longitudinal axes of jaw members 20 and 22 of connector elements 16 and 18 in a spaced, generally parallel nanner over central portion 24 of first connector element 16, between jaw members 20 of first and second connector elements 14 and 16 and in the form shown over free end 21 of first jaw member 20 of first connector element 16 and particularly in notches 46 thereof, between free ends 21 of first jaw members 20 of first and second connector elements 16 and 18, and over free end 21 of first jaw member 20 of second connector element 18 and particularly in notches 46 thereof), over central portion 24 of second connector element 18 parallel to the longitudinal axis of jaw members 20 and 22 of connector elements 16 and 18, and between jaw members 22 of first and second connector elements 14 and 16 (and in the form shown over free end 23 of second jaw member 22 of second connector element 18 and particularly in notches 46 thereof, between free ends 23 of second jaw members 22 of first and second connector elements 16 and 18, and over free end 23 of second jaw member 22 of first connector element 16 and particularly notches 46 thereof). In the form shown, the spacing between first and second O-rings 50 extending over central portion 24 of connector element 18 is generally equal to or slightly greater than the diameter of set screw 30, with set screw 30 located intermediate O-rings 50. The receipt of O-rings 50 in notches 46 maintains O-rings 50 in position adjacent to legs 26 and relative to connector elements 16 and 18 and specifically reduces the tendency for O-rings 50 to roll on central portions 24 of connector elements 16 and 13 in directions perpendicular to leas 26. Additionally, notches 46 space O-rings 50 inwardly from ends 21 and 23 to reduce their height above central portions 24 to be generally within the confines of logs 26. Further, notches 46 insure that O-rings 50 do not engage with set screw 30 in a manner resulting in wear which significantly reduces the expected life of O-rings 50. Additionally, due to the U-shaped cross sections, legs 26 prevent O-rings 50 from rolling past the sides of central portions 24 and off from connector elements 16 and 18. Extending O-rings 50 between jaw members 20 and 22 and especially when located in notches 46 tend to restrict relative movement of connector elements 16 and 18 in a single plane which is perpendicular to central portions 24 and parallel to legs 26.

Thus, O-rings 50 retain connector elements 16 and 18 together but allow relative movement therebetween. Specifically, due to their elastic nature, O-rings 50 act as rubber bands or similar elastic members which tend to draw connector elements 16 and 18 together with the second end of set screw 30 threaded in connector element 18 abutting with connector element 16. Thus, the spacing between connector elements 16 and 18 when drawn together by O-rings 50 is dependent on the positioning of set screw 30 and is adjustable according to the amount of threading of set screw 30.

In the most preferred form, connector 10 according to the preferred teachings of the present invention further includes a collar 32 having annular cross sections with an outer periphery of a shape corresponding to that of the outer periphery of tubular members 12 and 14 and in the most preferred form and especially for tubular members 12 and 14 having square, annular cross sections, the cross sections of collar 32 are the same size and shape as the cross sections of tubular members 12 and 14. Collar 32 includes an aperture 34 formed in the upper portion and of a size allowing passage and rotation of the allen wrench or similar tool for set screw 30 but preventing passage of set screw 30 therethrough. In the most preferred form, the free edges of legs 26 intermediate jaw members 20 and 22 and coinicident with set screw 30 include a portion 36 located below teeth 28 and having a shape for flushly abutting with the inside surfaces of the upper and lower portions of collar 32 and specifically which is flat in the most preferred form. In the most preferred form, the inside surfaces of the side portions of collar 32 are planar and slideably abut with the outside surfaces of legs 26. The abutment of legs 26 with the inside surfaces of the side portions of collar 32 tend to restrict relative movement of connector elements 16 and 18 in a single plane which is perpendicular to central portions 24 and parallel to legs 26.

Jaw members 20 and 22 of each connector element 16 and 18 in the most preferred form shown are symmetrical. Furthermore, connector elements 16 and 18 in the most preferred form are of identical construction to reduce fabrication costs, with tie threaded aperture for set screw 30 added to connector element 18 and with an aperture 42 which can be used in finishing connector element 16 added to connector element 16. Furthermore, it can be appreciated that the same connector elements 16 and 18 can be received in tubular members 12 and 14 having square annular cross sections and circular annular cross sections as well as other annular cross sectional shapes. Thus, in addition to reduced fabrication costs, inventory requirements are also reduced.

Now that the basic construction of connector 10 according to the preferred teachings of the present invention has been set forth, the assembly, use, and some advantages of connector 10 can be explained and appreciated. Specifically, after set screw 30 has been threaded into connector element 18, connector elements 16 and 18 are positioned with central portions 24 in a parallel relation with legs 26 of connector elements 16 and 18 extending in opposite directions. O-rings 50 can be stretched over and positioned on connector elements 16 and 18 on opposite sides of set screw 30. At that time, collar 32 can be slid over one end of connector elements 16 and 18 such as jaw members 22 as shown in FIG. 1 and into position such that the sides of legs 26 are received between the inside surfaces of the side portions of collar 32, portion 36 of connector element 16 is positioned to abut with the inside surface of the lower portion of collar 32, portion 36 of connector element 18 is positioned to abut with the inside surface of the upper portion of collar 32 and the first end of set screw 30 is positioned to abut with the inside surface of the upper portion of collar 32, with aperture 34 located generally concentrically around the tool recess of the first end of set screw 30 and adapted to allow access of a tool to the tool receiving recess of set screw 30. It can then be appreciated that connector 10 according to the preferred teachings of the present invention is then held together as a single unit and no loose parts or further assembly is required. By extending a tool through aperture 34 and into the recess of the first end of set screw 30, set screw 30 can be threaded into and out of connector element 18 of the assembled connector 10.

When it is desired to utilize connector 10 to interconnect to tubular member 12, set screw 30 should be threaded out of connector element 18 a distance such that teeth 28 of jaw members 20 can be inserted and slid in a longitudinal insertion direction parallel to the longitudinal axes of jaw members 20 and 22 of connector elements 16 and 18 between the inside surfaces of the upper and lower portions of tubular member 12 for an insertion distance which in the most preferred form is when the free end of tubular member 12 abuts with collar 32. It can be appreciated that the generally U-shaped cross sections of jaw members 20 and 22 are perpendicular to the longitudinal insertion direction. At that time and while jaw members 20 are inserted into tubular member 12, set screw 30 can be threaded for movement in a direction generally perpendicular to the longitudinal insertion direction into connector element 18. It can then be appreciated that due Lo the abutment of the second end of set screw 30 with central portion 24 of connector element 16, as set screw 30 is threaded into connector element 18, set screw 30 forces central portions 24 of connector elements 16 and 18 to separate against the bias of O-rings 50 and holds central portions 24 apart. As the central portions 24 separate, the distance between teeth 28 of jaw members 20 increase in an amount sufficient to allow teeth 28 to engage and grip the inside surfaces of tubular member 12 in a non-slip manner and specifically with sufficient force to prevent relative movement between jaw members 20 and tubular member 12. It should be noted that due to the greater hardness of connector elements 16 and 18 than tubular members 12 and 14, teeth 28 will tend to dig into the inside surfaces of tubular member 12 to enhance the non-slip engagement of connector 10 and tubular member 12.

In the most preferred form where connector 10 interconnects tubular members 12 and 14, after tubular member 12 has been slid over jaw members 20 and prior to threading set screw 30 into connector element 18, tubular member 14 can be similarly slid in a longitudinal insertion direction over jaw members 22 for an insertion distance which in the most preferred form is when the free end of tubular member 14 abuts with collar 32 on the opposite side than tubular member 12. It can then be appreciated that when set screw 30 is threaded into connector element 18, the distance between teeth 28 of jaw members 22 also increases in an amount sufficient to allow teeth 28 of jaw member 22 to engage and grip the inside surfaces of tubular member 14 in a non-slip manner and specifically with sufficient force to prevent relative movement between jaw members 20 and 22 and tubular members 12 and 14 and thus also between tubular members 12 and 14. Thus, connector 10 of the preferred form interconnects tubular members 12 and 14 together in an aligned, generally contiguous manner.

When it is desired to remove the interconnection of tubular members 14 and/or 12 from connector 10 according to the preferred teachings of the present invention, set screw 30 can be threaded out of connector element 18. Thus, central portions 24 of connector elements 16 and 18 are not forced and held apart by set screw 30 such that O-rings 50 draw connector elements 16 and 18 together and teeth 28 of jaw members 20 and 22 do not engage the inside surfaces of tubular members 12 and 14 with sufficient force to prevent relative movement. Thus, tubular members 14 and/or 12 can be slid longitudinally opposite to the insertion direction and from jaw members 22 and 20, respectively, to remove tubular members 14 and/or 12 from connector 10.

It should then be appreciated that connector 10 according to the preferred teachings of the present invention is advantageous for several reasons. First, modifications to tubular members 12 and 14 are not required such as providing a threaded end, welding or similar attachment of components thereto, and the like. Additionally, interconnection and disconnection occurs by movement only in the longitudinal insertion direction and specifically there is no requirement that tubular members 12 and 14 and/or connector 10 be moved in a lateral direction and in a nonparallel direction to the longitudinal insertion direction. Further, connector 10 according to the preferred teachings of the present invention provides a clean interconnection surface with the outer peripheries of tubular members 12 and 14 and specifically does not include any protuberances extending beyond the outer peripheries of tubular members 12 and 14 such as would be the case with a head and nut in a conventional bolt-type connection. Furthermore, as tubular members 12 and 14 always provide the female component of the interconnection, no particular orientation of tubular members 12 and 14 is required as either end of tubular members 12 and 14 can be utilized for interconnection. Additionally, tubular members 12 and 14 can be formed by standard techniques such as extrusion with normal tolerances and the components of connector 10 need not be formed with close tolerance manufacture such as would be required in sliding friction fit type connections. It should further be appreciated that set screw 30 and O-rings 50 are readily available, commercially standard parts, that collar 32 is formed by cutting an extruded tube, and connector elements 16 and 18 are fabricated from an identical metal stamping. Thus, connector 10 according to the preferred teachings of the present invention is of a simple design of few components that can be inexpensively manufactured and assembled. Furthermore, connector 10 interconnects and securely grips tubular members 12 and 14 to prevent separation when subjected to forces from any direction including but not limited to tensional forces parallel to tubular members 12 and 14.

In addition to being advantageous in its ability to be received in tubular members 12 and 14 of different shaped, annular cross sections, the preferred shape of connector elements 16 and 18 and in the most preferred form of legs 26 thereof allows connector 10 to be utilized in tubular members 12 and 14 which are linearly straight along their longitudinal lengths but also which are arcuate along their longitudinal lengths. Specifically, due to the arcuate shape of the free edges of legs 26 and the increasing height of jaw members 20 and 22 from their free ends 21 and 23 to the center of connector 10, the spacing between teeth 28 or in other words between the free edges of legs 26 of jaw members 20 and 22 of connector elements 16 and 18 of connector 10 increases from free ends 21 and 23 for the distance that jaw members 20 and 22 are inserted into tubular members 12 and 14. Thus, connector 10 is able to be inserted in the ends of arcuate shaped tubular members 12 and 14. The insertion direction of connector 10 may be parallel to the longitudinal shape of the tubular member 12 and 14 and not necessarily along a straight line. It should be appreciated that in the preferred form, teeth 28 on portions of the free edges of legs 26 may not engage tubular members 12 and 14 or may engage with unequal force as teeth 28 at other portions of the free edges of legs 26. Similarly, teeth 28 of jaw members 20 and 22 may not engage tubular members 12 and 14, respectively, in the same manner and/or jaw members 20 or 22 may not engage tubular members 12 or 14 in the same manner for connector elements 16 and 18. However, it should be appreciated that a sufficient amount of teeth 28 should engage the inside surfaces of tubular members 12 and 14 with sufficient force to interconnect and securely grip tubular members 12 and 14. This feature of being able to interconnect nonlinear tubular members 12 and 14 is especially important as it allows tubular members 12 and 14 to be removably connected in the shape of circles and arcs such as for the construction of trade show booths, store displays, arid the like.

It should be appreciated that the opposite, outwardly facing U-shaped, jaw member 20 and 22, especially with teeth 28 formed on the free edges of legs 26, are advantageous in maintaining tubular members 12 and 14 in a desired rotational position without requiring connection such as by pins between tubular members 12 and 14 and connector 10. Specifically, loads placed upon tubular members 12 and 14 can place forces which tend to rotate tubular members 12 and 14 about their longitudinal axes and result in one or both tubular members 12 and 14 having a tendency to twist relative to connector 10 especially when one or both of tubular members 12 and 14 have circular cross sections. The abutment of the free edges of legs 26, and in the preferred form teeth 28 thereof, securely grip the inside surfaces of tubular members 12 and 14 to maintain tubular members 12 and 14 in the desired rotational position.

It should be noted that connector 10 according to the teachings of the present invention is also advantageous in equalizing pressures between tubular members 12 and 14 when placed under load. In particular, the second end of set screw 30 acts as a fulcrum allowing connector elements 16 and 18 to tip so that the engagement forces on tubular members 12 and 14 by jaw members 20 and 22 are equalized. This feature is especially important when connector 10 according to the teachings of the present invention connects arcuate tubular members 12 and 14.

Now that the basic teachings of the present invention have been explained, many extensions and variations will be obvious to one skilled in the art. For example, the shapes of the annular cross sections of tubular members 12 and 14 and/or of jaw members 20 and 22 and other components of connector 10 can take other forms according to the teachings of the present invention. As an example, jaw members 20 and 22 could be U-shaped but with legs 26 extending outwardly at an obtuse angle to central portions 24. In such an arrangement, legs 26 could be angled so that the free edges of legs 26 engage the corners of tubular members 12 and 14 having cross sections of a right parallelepiped shape. This would be especially important for gripping the inside surfaces of tubular members 12 and 14 when subjected to deflection forces parallel to central portions 24. Also, this would be advantageous for gripping the inside surfaces of tubular members 12 and 14 having circular cross sections.

Similarly, the preferred form shown utilizes connector 10 to connect tubular members 12 and 14 of an elongated length. However, connector 10 according to the teachings of the present invention could also be utilized to connect tubular member 12 of an elongated length to tubular member 14 of a reduced length even less than the length of jaw members 22. As an example, connector 10 could be utilized to connect tubular member 12 to a wall, node, or similar structure.

Further, although connector 10 in the preferred form shown includes separate, first and second connector elements 16 and 18 each having first and second jaw members 20 and 22 which is especially advantageous for connecting first and second tubular members 12 and 14, connector 10 can include other configurations according to the teachings of the present invention. As an example, connector elements 16 and 18 could each include first jaw members 20 for connecting to tubular member 12 and could include jaws or other provisions for connecting tubular member 12 to other members which may be tubular and/or which may not be of an elongated thickness.

Likewise, although connector 10 of the preferred form interconnects tubular member 12 generally coextensive and in alignment with tubular member 14, connector 10 according to the teachings of the present invention can provide other forms of interconnection. For example, jaw members 20 and 22 could be arranged at a non-linear angle. Although it would then be unable to fabricate connector elements 16 and 18 from an identical metal stamping, it may be desired in certain applications to interconnect tubular members 12 and 14 at non-linear angles. Further, connector 10 can be arranged to interconnect tubular member 12 to more than one further tubular member 14 or to other types of members such as horizontal or vertical support panels. For example, connector elements 16 and 18 could rave jaw members 20 and 22 arranged in a Y, X, or other shape according to the teachings of the present invention.

Furthermore, although collar 32 has an outer periphery corresponding to those of tubular members 12 and 14 in the form shown and is believed to be advantageous as not providing protuberances extending beyond the outer peripheries of tubular members 12 and 14, collar 32 could have other shapes and sizes according to the teachings of the present invention such as for becoming a decorative element. Likewise, collar 32 could provide a transitional function between dissimilar sized or shaped tubular members 12 and 14. In this regard, the fulcrum function of the second end of set screw 30 would be especially important in equalizing pressure between tubular members 12 and 14 of dissimilar sizes or shapes.

Although collar 32 is believed advantageous in at least providing access to set screw 30 without requiring modification to tubular members 12 and 14 and not requiring particular orientations inside of tubular members 12 and 14, access to set screw 30 from outside of tubular members 12 ant 14 can be accomplished according to the teachings of the present invention by other methods such as providing access openings in one or both of tubular members 12 and 14.

Likewise, although the use of two O-rings 50 passing between ends 21 and 23 in biasing connector elements 16 and 18 together is believed to be advantageous at least because of availability and ease of assembly, connector elements 16 and 18 could be biased together by other manners according to the teachings of the present invention. For example, a single O-ring 50 of an elongated length could have one end looped around set screw 30, then extend over jaw member 22 of connector element 18, between ends 23 of connector elements 16 and 18, over jaw members 22 and 20 of connector element 18, between ends 21 of connector elements 16 and 18, and over jaw member 20 of connector element 16, with the opposite end also being looped around set screw 30. Alternately, such an O-ring 50 could be extended between connector elements 16 and 18 by passing through apertures 42 formed in jaw members 20 and 22 of both connector elements 16 and 18 rather than passing around ends 21 and 23. O-ring 50 passing through apertures 42 is positioned in jaw members 20 and 22 spaced from ends 21 and 23 and is less prone to damage if ends 21 and 23 engage an object such as when accidentally dropped. Additionally, connector elements 1G and 18 could be biased by a rubber band having an elongated width generally equal to and for receipt within the spacing between legs 26 and including an aperture for passage of set screw 30. It should be appreciated that it may be desirable to include a sleeve or other protection for set screw 32 to prevent undesired engagement of O-rings 50 especially if O-rings 50 are looped around or otherwise contacts set screw 30.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

I claim:

1. Connector for a tubular member having annular cross sections, an inside surface, and a free end, comprising, in combination: first and second jaw members each having free ends, with the free ends of the first and second jaw members being insertable into the tubular member for an insertion distance in a longitudinal insertion direction through the free end of the tubular member, with the first and second jaw members including free edges for engaging with the inside surface of the tubular member, with the spacing between the free edges of the first and second jaw members increasing from the free ends for the insertion distance; and means for separating the first and second jaw members while inserted into the tubular member for the insertion distance sufficient to allow the free edges of the jaw members to grip the inside surface of the tubular member with sufficient force to prevent relative movement between the first and second jaw members and the tubular member, with the separating means being operable from outside of the tubular member.

2. The connector of claim 1 wherein the free edges of each of the jaw members is arcuate from the free end for the insertion distance.

3. The connector of claim 2 wherein the free edges are cut to define teeth to enhance non-slip engagement with the tubular member.

4. The connector of claim 1 wherein the first and second jaw members each have generally U-shaped cross sections perpendicular to the longitudinal insertion direction and each includes a central portion and first and second legs upstanding from the opposite sides of the central portion, with the central portions of the first and second jaw members being in a parallel relation and with the legs of the first jaw member extending in the opposite direction than the legs of the second jaw member, with the legs having the free edges.

5. The connector of claim 4 wherein the annular cross sections of the tubular member have a height and a width; and wherein the central portions have a length generally equal to the width of the tubular member, with the maximum heights that the legs upstand from the central portions being less than one-half of the height of the tubular member.

6. The connector of claim 1 wherein the separating means comprises a screw threaded in the second jaw member and having a first end which abuts with the first jaw member and a second end opposite to the first end, with the threading of the screw causing the first and second jaw members to separate; and wherein the connector further comprises, in combination: a collar having a first surface positioned for abutting with the first jaw member opposite to the second jaw member and a second surface positioned for abutting with the second end of the screw.

7. The connector of claim 1 further comprising, in combination: a third jaw member and a fourth jaw member, with the first and third jaw members being integrally connected and the second and fourth jaw members being integrally connected and separately formed from the first and third jaw members, with the third and fourth jaw members each having a free end and being insertable in the longitudinal insertion direction into another tubular member, with the third and fourth jaw members each including free edges for engaging with the inside surface of the other tubular member, with the spacing between the free edges of the third and fourth jaw members increasing from the free ends of the third and fourth jaw members, with the separating means simultaneously separating the third and fourth jaw members to allow the third and fourth jaw members to grip the inside surface of the other tubular member to prevent relative movement between the third and fourth jaw members and the other tubular member and also between the tubular members.

8. Connector for a tubular member having annular cross sections, an inside surface, and a free end, comprising, in combination: first and second jaw members each having free ends, with the free ends of the first and second jaw members being insertable into the tubular member in a longitudinal insertion direction through the free end of the tubular member; means for biasing the first and second jaw members together, with the biasing means extending generally parallel to the insertion direction over each of the first and second jaw members and extending between the first and second jaw members; and means for separating the first and second jaw members against the bias of the biasing means while inserted into the tubular member a distance sufficient to allow the jaw members to grip the inside surface of the tubular member with sufficient force to prevent relative movement between the first and second jaw members and the tubular member, with the separating means being operable from outside of the tubular member.

9. The connector of claim 8 wherein the biasing means extends between the first and second jaw members by extending over and between the free ends of the first and second jaw members; and wherein each of the first and second jaw members includes at least a first notch extending from the free end in a direction parallel to the insertion direction, with the biasing means received in the notches of the first and second jaw members.

10. The connector of claim 8 wherein the first and second jaw members each have generally U-shaped cross sections perpendicular to the longitudinal insertion direction and each includes a central portion and first and second legs upstanding from the opposite sides of the central portion, with the central portions of the first and second jaw members being in a parallel relation and with the legs of the first jaw member extending in the opposite direction than the legs of the second jaw member, with the biasing means extending over the central portions between the first and second legs of the first and second jaw members.

11. The connector of claim 10 wherein the biasing means extends between the first and second jaw members by extending over and between the free ends of the first and second jaw members; and wherein the central portion of each of the first and second jaw members includes at least a first notch extending from the free end in a direction parallel to the insertion direction, with the biasing means received in the notches of the first and second jaw members.

12. The connector of claim 10 wherein the legs have free edges cut to define teeth to enhance non-slip engagement with the tubular member.

13. The connector of claim 8 wherein the separating means comprises a screw expending between the first and second jaw members, with the threading of the screw causing the first and second jaw members to separate; and wherein the biasing means comprises first and second elastic members, with the screw located intermediate the first and second elastic members.

14. The connector of claim 13 wherein the screw is threaded in the second jaw member and has a first end which abuts with the first jaw member and a second end opposite to the first end; and wherein the connector further comprises, in combination: a collar having a first surface positioned for abutting with the first jaw member opposite to the second jaw member and a second surface positioned for abutting with the second end of the screw.

15. The connector of claim 8 wherein the biasing means comprises at least a first O-ring.

16. The connector of claim 8 further comprising, in combination: a third jaw member and a fourth jaw member, with the first and third jaw members being integrally connected and the second and fourth jaw members being integrally connected and separately formed from the first and third jaw members, with the third and fourth jaw members each having a free end and being insertable in the longitudinal insertion direction into another tubular member, with the biasing means extending generally parallel to the insertion direction over each of the third and fourth jaw members and extending between the third and fourth jaw members, with the separating means simultaneously separating the third and fourth jaw members to allow the third and fourth jaw members to grip the inside surface of the other tubular member to prevent relative movement between the third and fourth jaw members and the other tubular member and also between the tubular members.

17. The connector of claim 16 wherein the first and third jaw members and the second and fourth jaw members extend along a straight line.

18. Connector for a tubular member having annular cross sections, an inside surface, and a free end, comprising, in combination: first and second jaw members each having free ends, with the free ends of the first and second jaw members being insertable into the tubular member for an insertion distance in a longitudinal insertion direction through the free end of the tubular member, with the first and second jaw members including free edges for engaging with the inside surface of the tubular member, with the spacing between the free edges of the first and second jaw members increasing from the free ends for the insertion distance; means for biasing the first and second jaw members together, with the biasing means extending generally parallel to the insertion direction over each of the first and second jaw members and extending between the first and second jaw members; and means for separating the first and second jaw members while inserted into the tubular member for the insertion distance sufficient to allow the free edges of the jaw members to grip the inside surface of the tubular member with sufficient force to prevent relative movement between the first and second jaw members and the tubular member, with the separating means being operable from outside of the tubular member.

19. The connector of claim 18 wherein the free edges of each of the jaw members is arcuate from the free end for the insertion distance.

20. the connector of claim 19 wherein the first and second jaw members each have generally U-shaped cross sections perpendicular to the longitudinal insertion direction and each includes a central portion and first and second legs upstanding from the opposite sides of the central portion, with the central portions of the first and second jaw members being in a parallel relation and with the legs of the first jaw member extending in the opposite direction than the legs of the second jaw member, with the biasing means extending over the central portions between the first and second legs of the first and second jaw members, with the legs having the free edges.

* * * * *

UNITED STATES PATENT AND TRADEMARK OFFICE
CERTIFICATE OF CORRECTION

PATENT NO : 5,893,675

DATED : April 13, 1999

INVENTOR(S) : Lange, Fredric

It is certified that error appears in the above-identified patent and that said Letters Patent is hereby corrected as shown below:

Col. 4, line 47, cancel "nanner" and substitute therefor --manner--.

Col. 4, line 50, cancel "and" and substitute therefor --(and--.

Col. 5, line 7, cancel "13" and substitute therefor --18--.

Col. 5, line 7, cancel "leas" and substitute therefor --legs--.

Col. 5, line 10, cancel "logs" and substitute therefor --legs--.

Col. 5, line 61, cancel "tie" and substitute therefor --the--.

Col. 6, line 49, cancel "Lo" and substitute therefor --to--.

Col. 8, line 5, cancel "tubular 10" and substitute therefor --tubular--.

Col. 8, line 37, cancel "arid" and substitute therefor --and--.

Col. 8, line 39, cancel "member" and substitute therefor --members--.

Col. 10, line 27, cancel "1G" and substitute therefor --16--.

Col. 14, line 4, cancel "the connector" and substitute therefor --The connector--.

UNITED STATES PATENT AND TRADEMARK OFFICE
CERTIFICATE OF CORRECTION

PATENT NO : 5,893,675

DATED : April 13, 1999

INVENTOR(S) : Lange, Fredric

It is certified that error appears in the above-identified patent and that said Letters Patent is hereby corrected as shown below:

Col. 2, line 20, cancel "directions;" and substitute therefor --directions--.

Col. 2, line 34, cancel "In" and substitute therefor --in--.

Col. 3, line 9, cancel "Front" and substitute therefor --front--.

Col. 3, line 65, cancel "at is" and substitute therefor --at--.

Col. 4, line 3, cancel "Or" and substitute therefor --of--.

Col. 4, line 21, cancel "alien" and substitute therefor --allen--.

Col. 4, line 26, cancel "thee" and substitute therefor --the--.

Col. 4, line 27, cancel "element." and substitute therefor --element--.

Col. 4, line 36, cancel "in" and substitute therefor --In--.

Col. 4, line 37, cancel "13" and substitute therefor --18--.

Col. 4, line 45, cancel "skied" and substitute therefor --second--.

Signed and Sealed this

Thirtieth Day of May, 2000

*Attest:*

Q. TODD DICKINSON

*Attesting Officer*      *Director of Patents and Trademarks*